(12) United States Patent  
Yamamoto et al.

(10) Patent No.: US 8,094,365 B2
(45) Date of Patent: Jan. 10, 2012

(54) WHITE PARTICLES FOR DISPLAY, PARTICLE DISPERSION FOR DISPLAY, DISPLAY MEDIUM AND DISPLAY DEVICE

(75) Inventors: Yasuo Yamamoto, Kanagawa (JP); Hiroaki Moriyama, Kanagawa (JP); Yoshinori Yamaguchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 205 days.

(21) Appl. No.: 12/552,784

(22) Filed: Sep. 2, 2009

(65) Prior Publication Data

US 2010/0225997 A1 Sep. 9, 2010

(30) Foreign Application Priority Data

Mar. 5, 2009 (JP) .................. 2009-052027

(51) Int. Cl.
G02B 26/00 (2006.01)
(52) U.S. Cl. ...................................... 359/296
(58) Field of Classification Search .................. 359/296; 345/107
See application file for complete search history.

(56) References Cited

U.S. PATENT DOCUMENTS

| | | | |
|---|---|---|---|
| 4,620,916 A * | 11/1986 | Zwemer et al. ............ | 359/296 |
| 4,806,443 A | 2/1989 | Yanus et al. | |
| 5,622,804 A | 4/1997 | Matsuoka et al. | |
| 5,723,250 A | 3/1998 | Matsuoka et al. | |
| 5,863,684 A | 1/1999 | Suzuki et al. | |
| 6,693,621 B1 | 2/2004 | Hayakawa et al. | |
| 6,930,668 B2 * | 8/2005 | Noolandi et al. ............ | 345/107 |
| 2004/0223208 A1 | 11/2004 | Yu et al. | |
| 2008/0193769 A1 | 8/2008 | Yanagisawa et al. | |
| 2008/0252566 A1 | 10/2008 | Kawase et al. | |
| 2010/0020384 A1 | 1/2010 | Machida et al. | |

FOREIGN PATENT DOCUMENTS

| | | |
|---|---|---|
| JP | A 07-325434 | 12/1995 |
| JP | A 10-003177 | 1/1998 |
| JP | A 2001-033831 | 2/2001 |
| JP | A 2001-188269 | 7/2001 |
| JP | A 2003-131420 | 5/2003 |
| JP | A 2003-192755 | 7/2003 |
| JP | A 2004-043342 | 2/2004 |
| JP | A 2004-279732 | 10/2004 |
| JP | A 2006-096985 | 4/2006 |
| JP | A 2006-520483 | 9/2006 |
| JP | A 2007-231208 | 9/2007 |
| JP | A-2008-224839 | 9/2008 |
| JP | A-2009-064004 | 3/2009 |
| JP | A-2006-098382 | 5/2009 |
| JP | A-2010-164659 | 7/2010 |
| JP | A-2010-191268 | 9/2010 |
| WO | WO 2010/082407 A1 | 7/2010 |

OTHER PUBLICATIONS

Japanese Office Action issued in Application No. 2009-052027; dated Oct. 5, 2010 (with translation).

* cited by examiner

*Primary Examiner* — Scott J Sugarman
*Assistant Examiner* — Vipin Patel
(74) *Attorney, Agent, or Firm* — Oliff & Berridge, PLC

(57) ABSTRACT

White particles for display including first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship: $1/(5.1\times10^7) \leq L/S \leq 1/(2.8\times10^4)$.

16 Claims, 3 Drawing Sheets

WHITE PARTICLES FOR DISPLAY, PARTICLE DISPERSION FOR DISPLAY, DISPLAY MEDIUM AND DISPLAY DEVICE

CROSS-REFERENCE TO RELATED APPLICATION

This application is based on and claims priority under 35 USC 119 from Japanese Patent Application No. 2009-052027 filed Mar. 5, 2009.

BACKGROUND

The invention relates to white particles for display, a particle dispersion for display, a display medium, and a display device.

RELATED ART

Conventionally, a display medium employing colored particles has been known as a re-writable display device. This display medium includes, for example, a pair of substrates and particles that are enclosed between the substrates such that the particles can move between the substrates in response to an electric field formed between the substrates.

SUMMARY

An aspect of the invention provides white particles for display comprising first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship:

$$1/(5.1\times10^7) \leq L/S \leq 1/(2.8\times10^4).$$

BRIEF DESCRIPTION OF THE DRAWINGS

Exemplary embodiments of the present invention will be described in detail based on the following figures, wherein.

DETAILED DESCRIPTION (White Particles for Display)

Figure 1:
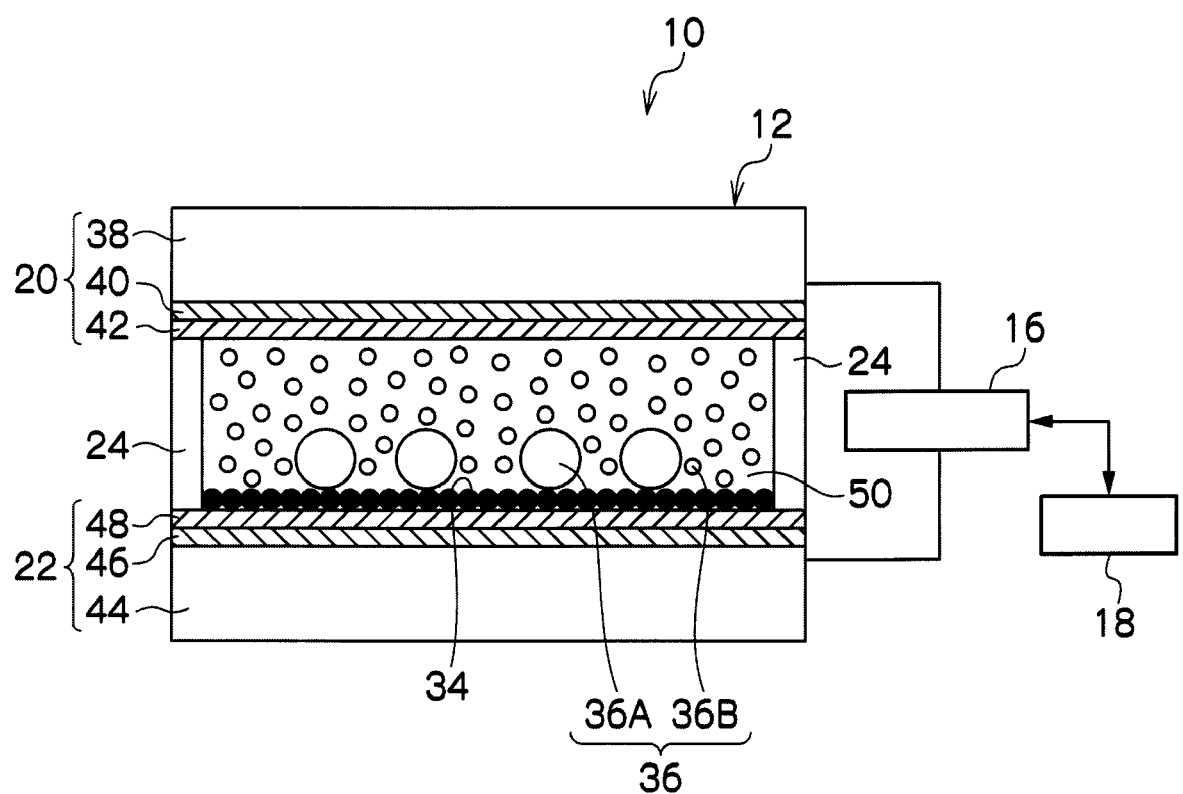
FIG. 1 is a schematic view of a display device according to a first exemplary embodiment of the invention.

The white particles for display according to the invention include first white particles that move in response to an electric field (hereinafter, referred to as large white particles) and second white particles that do not move in response to an electric field (hereinafter, referred to as small white particles). In other words, the white particles for display according to the invention include particles having different levels of electric-field responsiveness and different particles sizes. Further, the amount of large white particles and the amount of small white particles satisfy a ratio based on number as described later.

In the invention, since the small white particles do not move in response to an electric field and have a smaller volume average particle size than that of the large white particles, the small white particles tend to be suspended in a dispersion medium of the display medium, and tend to be present at a middle portion in a thickness direction of a space formed by the substrates, thereby improving whiteness in a constant and stable manner. On the other hand, since the large white particles have a greater volume average particles size than that of the small white particles, the large white particles improve the effect of concealing color particles that are included in the display medium, thereby improving whiteness. In addition, since the large white particles move in response to an electric field, the large white particles have a greater motion energy than that of the small white particles. As a result, the large white particles exhibit an effect of agitating the dispersion medium in the display medium, thereby serving to dissolute the color particles that have aggregated or suppress the aggregation of the same. Moreover, the agitation effect of the large white particles may also serve to disaggregate the aggregated small white particles or suppress the aggregation of the small white particles.

Accordingly, by employing the white particles for display according to the invention, aggregation of particles included in the display medium may be suppressed and whiteness may be improved. As a result, when the white particles according to the invention are used in a white display medium, display defects due to aggregation of color particles may be suppressed and a white color with a high degree of whiteness may be displayed. Specifically, for example, when color particles of a single color are used in the display device, display irregularities due to aggregation of the color particles may be suppressed. Further, when color particles of two or more colors are used in the display device, color mixing due to aggregation of these color particles may be suppressed.

The large white particles may have a volume average particle size of from 1 μm to 30 μm, preferably from 2 μm to 20 μm, more preferably from 3 μm to 10 μm. When the size of the large white particles is too small, the motion energy caused by the migration of particles may be too small, and their ability of agitating the dispersion medium in the display medium may be reduced. When the size of the large white particles is too large, the weight of the same may be too heavy and the dispersion stability thereof may be deteriorate, thereby causing irregular white color display.

The small white particles may have a volume average particle size of from 0.1 μm to 3.0 μm, preferably from 0.2 μm to 2.0 μm, more preferably from 0.3 μm to 1.0 μm. When the size of the small white particles is too small, aggregation of the particles may occur to cause irregular white color display. When the size of the small white particles is too large, sedimentation of the particles may occur and the dispersion stability of the same may deteriorate, thereby causing irregular white color display.

The difference between the volume average particle size of the large white particles and the volume average particle size of the small white particles may be from 0.9 μm to 28.8 μm, preferably from 1.8 μm to 18.8 μm, more preferably from 2.7 μm to 9.0 μm. When the difference in particle size is within this range, the large white particles may exhibit such abilities as to conceal color particles or agitate the dispersion medium in the display medium, while the small white particles may improve the whiteness in a constant and stable manner.

When the volume average particles size of the particles is 2 μm or more, the measurement is conducted with a COULTER COUNTER TA-II (trade name, manufactured by Beckman Coulter, Inc.) using ISOTON-II (trade name, manufactured By Beckman Coulter, Inc.) as an electrolyte.

The measurement is conducted by a method including adding 0.5 to 50 mg of a sample to 2 ml of an aqueous solution including a surfactant as a dispersant, preferably 0.5% of sodium alkylbenzene sulfonate, and adding the same to 100 to 150 ml of the aforementioned electrolyte; subjecting this electrolyte in which the sample is suspended to a dispersion treatment for 1 minute using an ultrasonic disperser; and then measuring the particle size distribution of the particles having a particles size of 2.0 to 60 µm using the COULTER COUNTER TA-II with an aperture having a diameter of 100 µm. The number of the particles for measurement is 50,000.

When the volume average particle size of the particles is less than 2 µm, the measurement is conducted with a laser scattering particle size measurement device (trade name: FPAR 1000, manufactured by Otsuka Electronics Co., Ltd.)

In the following, the amount ratio of the large white particles and the small white particles will be described.

The amount of the small white particles in the white particles is greater than that of the large white particles. Specifically, a ratio of the numerical amount of the first white particles/the second white particles (L/S) satisfies the following relationship:

$$1/(5.1 \times 10^7) \leq L/S \leq 1/(2.8 \times 10^4).$$

Preferably, the L/S ratio satisfies the following relationship:

$$1/(1.0 \times 10^6) \leq L/S \leq 1/(3.0 \times 10^4)$$

More preferably, the L/S ratio satisfies the following relationship:

$$1/(5.0 \times 10^6) \leq L/S \leq 1/(1.0 \times 10^5)$$

When the amount ratio of large white particles and small white particles is within the above range, abilities of the large white particles to conceal the color particles or agitate the dispersion medium in the display medium may be exhibited, while the small white particles may improve the whiteness in a constant and stable manner.

The amount ratio as mentioned above (A) can be calculated from the following equation.

$$A = X \ast dS^3 \ast \rho S/(100-X) \ast dL^3 \ast \rho L$$

In the equation, X is an addition amount ratio of the large white particles (%); 100−X is an addition amount ratio of the large white particles (%); ρL and ρS are a specific gravity of the large white particles and a specific gravity of the small white particles, respectively; dL and dS are a volume average particle size of the large white particles and a volume average particle size of the small white particles, as measured by a particle size measurement device, respectively; and * is a symbol that indicates multiplication.

The specific gravity of the particles can be measured using a specific gravity meter. In this case, both the large white particles and the small white particles are measured using the same measurement apparatus. There is also a method of measuring the specific gravity of the materials of the large white particles and the small white particles, and then calculating the specific gravity of the particles from the obtained specific gravity. In this case, the measurement and the calculation for the large white particles and the small white particles may be conducted in the same manner.

The large white particles and the small white particles may be white particles formed from a white colorant itself, or may be formed from resin particles in which a white colorant is dispersed or compounded, or resin particles on which a white colorant is fixed (in the following, the white particles of both types are referred to as white mother particles, sometimes). The white particles for display according to the invention may include a component other than the above.

In particular, the large white particles are preferably formed from resin particles in which a white colorant is dispersed or compounded or resin particles on which a white colorant is fixed, while the small white particles are preferably white particles formed from a white colorant itself. Further, the large white particles and the small white particles preferably have different values of specific gravity. In particular, the specific gravity of the large white particles is preferably greater than that that of the small white particles. In this case, spontaneous sedimentation of the large white particles may easily be caused between the substrates while suppressing adhesion of the particles to the display-side substrate, whereby display of other colors is less affected and irregular white color display may be suppressed. In addition, when the motion energy of large white particles is increased, the ability of agitating the dispersion medium may be more easily exhibited. It is particularly preferred to form the small white particles, which contribute to the improvement of the whiteness to a greater extent than the large white particles do, from a white colorant having a greater refractive index than that of the dispersion medium.

Specifically, for example, the large white particles are formed from resin particles in which a white colorant having a high specific gravity (such as titanium oxide) is dispersed or compounded, while the small white particles are formed from a white colorant having a low specific gravity and a greater refractive index than that of the dispersion medium (such as a polysilane compound as described later).

The white mother particles of the large white particles, which move in response to an electric field, are preferably formed by using a polymer having a charging group for the white mother particles. Alternatively, the surface of white mother particles may be treated with a reactive silicone polymer (described later) including a component having a charging group.

On the other hand, the white mother particles of the small white particles, which do not move in response to an electric field, are preferably formed from a polymer having no charging group. Alternatively, the white mother particles are treated with a silicone polymer not including a component having a charging group.

The resin that forms the white particles for display according to the invention may be, for example, a thermoplastic resin or a thermosetting resin.

Examples of the thermoplastic resin include homopolymers or copolymers of styrenes (such as styrene and chlorostyrene), monoolefins (such as ethylene, propylene, butylene and isoprene), vinyl esters (such as vinyl acetate, vinyl propionate, vinyl benzoate and vinyl butyrate), α-methylene aliphatic monocarboxylates (such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate), vinyl ethers (such as vinyl methyl ether, vinyl ethyl ether and vinyl butyl ether), and vinyl ketones (such as vinyl methyl ketone, vinyl hexyl ketone and vinyl isopropenyl ketone).

Examples of the thermosetting resins include crosslinked resins (such as a crosslinked copolymer including divinyl benzene as a main component and a crosslinked polymethyl methacrylate), phenol resins, urea resins, melamine resins, polyester resins and silicone resins.

The resin that forms the resin particles may be a polymer (resin) having a charging group. The polymer having a charging group refers to a polymer having a cationic group or an anionic group as a charging group. Examples of the cationic group include an amino group and a quaternary ammonium group (and a salt of these groups). These cationic groups positively charge the particles.

Examples of the anionic group include a phenol group, a carboxyl group, a carboxylate group, a sulfonic group, a sulfonate group, a phosphoric group, a phosphate group, and a tetraphenyl boron group (and a salt of these groups). These anionic groups negatively charge the particles.

The polymer having a charging group may be a homopolymer of a monomer having a charging group, or a copolymer of a monomer having a charging group and a monomer having no charging group.

The monomer having a charging group may be a monomer having a cationic group (hereinafter, referred to as a cationic monomer) or a monomer having an anionic group (hereinafter, referred to as an anionic monomer). In the following, the description "(meth)acrylate" or the like refers to both acrylate and methacrylate.

Examples of the cationic monomer include (meth)acrylates having an aliphatic amino group, such as N,N-dimethylaminoethyl(meth)acrylate, N,N-diethylaminoethyl(meth)acrylate, N,N-dibutylaminoethyl(meth)acrylate, N,N-hydroxyethylaminoethyl(meth)acrylate, N-ethylaminoethyl(meth)acrylate, N-octyl-N-ethylaminoethyl(meth)acrylate, and N,N-dihexylaminoethyl(meth)acrylate; aromatic-substituted ethylenic monomers having a nitrogen-containing group, such as dimethylaminostyrene, diethylaminostyrene, dimethylaminomethylstyrene and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; vinylamine; pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidine; imidazoles such as N-vinyl-2-methyl imidazole; imidazolines such as N-vinyl imidazoline, indoles such as N-vinyl indole, indolines such as N-vinyl indoline, carbazoles such as N-vinyl carbazole and 3,6-dibromo-N-vinyl carbazole, pyridines such as 2-vinyl pyridine, 4-vinyl pyridine and 2-methyl-5-vinyl pyridine, piperidines such as (meth)acrylic piperidine, N-vinyl piperidone and N-vinyl piperaxine, quinolines such as 2-vinyl quinoline and 4-vinyl quinoline, pyrazoles such as N-vinyl pyrazole and N-vinyl pyrazoline, oxazoles such as 2-vinyl oxazole, and oxazines such as 4-vinyl oxazine and morpholinoethyl (meth)acrylate.

In view of versatility, the cationic monomer is preferably a (meth)acrylate having an aliphatic amino group such as N,N-dimethylaminoethyl(meth)acrylate and N,N-diethylaminoethyl(meth)acrylate. In particular, these monomers are preferably used in the form of a quaternary ammonium salt before or after the polymerization. The quaternary ammonium salt may be obtained by allowing the monomer to react with an alkyl halide or a tosylate.

Examples of the anionic monomer include carboxylic acid monomers such as (meth)acrylic acid, crotonic acid, itaconic acid, maleic acid, fumaric acid, citraconic acid, anhydrides and monoalkyl esters of these monomers, and vinyl ethers having a carboxyl group such as carboxylethyl vinyl ether and carboxylpropyl vinyl ether;

sulfonic acid monomers such as styrene sulfonic acid, 2-acrylamide-2-methylpropane sulfonic acid, 3-sulfopropyl (meth)acrylic acid ester, bis-(3-sulfopropyl)itaconic acid ester, a salt of these monomers, and a sulfonic acid monoester of 2-hydroxyethyl(meth)acrylic acid or a salt of the same;

phosphoric acid monomers such as vinyl phosphoric acid, vinyl phosphate, acid phosphoxyethyl(meth)acrylate, acid phosphoxypropyl(meth)acrylate, bis(methacryloyoxyethyl) phosphate, diphenyl-2-methacyloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth)acryloyloxyethyl phosphate.

The anionic monomer is preferably a monomer having a (meth)acrylic acid or a sulfonic acid, more preferably a monomer forming an ammonium salt before or after the polymerization. The ammonium salt may be obtained by allowing the monomer to react with a tertiary amine or a quaternary ammonium hydroxide.

Examples of the monomer having no charging group include a nonionic monomer such as (meth)acrylonitrile, alkyl(meth)acrylate, (meth)acrylamide, ethylene, propylene, butadiene, isoprene, isobutylene, N-dialkyl-substituted (meth)acrylamide, styrene, styrene derivatives, vinyl carbazole, polyethylene glycol mono(meth)acrylate, vinyl chloride, vinylidene chloride, isoprene, butadiene, N-vinyl pyrrolidone, hydroxyethyl(meth)acrylate, and hydroxybutyl (meth)acrylate. The copolymerization ratio of the monomer having a charging group and the monomer having no charging group may be determined depending on the desired charge amount of the particles, and is typically selected from the range of 1:100 to 100:1 (molar ratio, monomer having a charging group:monomer having no charging group).

In addition to the aforementioned monomers, in view of compatibility with the solvent, it is also possible to use a polymerizable monomer, a macromer or a block monomer that is compatible with the solvent. The amount of these monomer, macromer or block monomer may be from about 5 to about 70%, or may be up to about 80% of the total components.

The weight average molecular weight of the resin that forms the resin particles is preferably from 1,000 to 1,000,000, more preferably from 10,000 to 200,000.

Examples of the white colorant include white pigments such as titanium oxide (such as rutile titanium oxide or anatase titanium oxide), calcium carbonate, barium carbonate, zinc oxide, white lead, zinc sulfide, aluminum oxide, silicon oxide, and zirconium oxide.

In particular, the white colorant used for the large white particles is preferably titanium oxide due to its relatively high specific gravity and relatively high whiteness. Among the titanium oxides, rutile titanium oxide is preferred. In order to adjust the zeta potential, other kinds of white colorant (such as calcium carbonate or barium carbonate) may be used in combination with titanium oxide.

The white colorant may be a chain or cyclic polysilane compound having the following structure represented by Formula (I), or a halogen-substituted compound of the same (hereinafter, these compounds may be referred to as a specific polysilane compound). Since these compounds exhibit a high refractive index (for example, 1.65 or more) and a small specific gravity (for example, 1.2 or less), sedimentation of the particles may be effectively suppressed while improving the whiteness. Therefore, the specific polysilane compound is preferably used as a white colorant for the small white particles.

Formula (I)

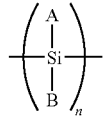

In Formula (I), A represents a phenyl group, B represents an alkyl group or a phenyl group, and n represents a natural number. The weight average molecular weight of this compound is preferably from 10,000 to 100,000.

The alkyl group represented by B may be an alkyl group having 1 to 22 carbon atoms, preferably an alkyl group having 1 to 12 carbon atoms, more preferably an alkyl group having 1 to 6 carbon atoms. The alkyl group may be a straight chain alkyl group or a branched chain alkyl group. Examples of the alkyl group include a methyl group, an ethyl group, a propyl group, an n-butyl group, a sec-butyl group, a hexyl group, an octyl group, a decyl group and a stearyl group.

The specific polysilane compound may be a chain polysilane compound or a cyclic polysilane compound.

The chain polysilane compound preferably has a structure represented by the following Formula (I-1A). In Formula (I-1A), n represents a natural number. The weight average molecular weight of this compound is preferably from 10,000 to 100,000.

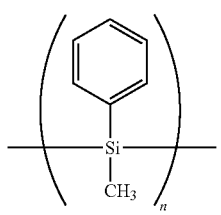

Formula (I-1A)

The cyclic polysilane compound preferably has a structure represented by the following Formula (I-2A). This polysilane compound has five of the structure represented by Formula (I), but a compound having six of the same is also preferred.

Formula (I-2A)

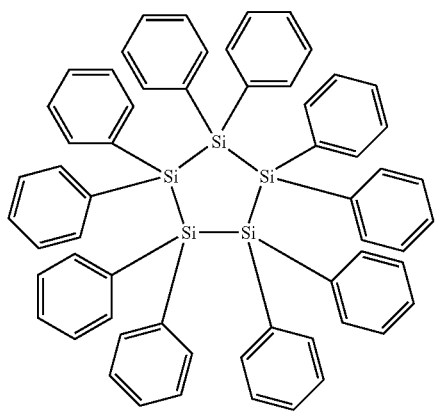

The specific polysilane compound may be a halogen-substituted compound of the chain or cyclic polysilane compound having a structure represented by Formula (I). The halogen-substituted compound refers to a polysilane compound in which a phenyl group of at least one of the polysilane structure represented by Formula (I) has a halogen substituent (such as fluorine or chlorine). The halogen-substituted compound exhibits an improved refractive index as compared with the unsubstituted compound. Specific examples of the halogen-substituted polysilane compound include a chain polysilane compound represented by the following Formula (I-1B) or a cyclic polysilane compound represented by the following Formula (I-2B). In Formula (I-1B) and Formula (I-2B), R represents a halogen atom, and n has the same definitions as that of Formula (I-1A).

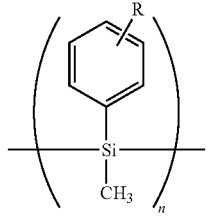

Formula (I-1B)

Formula (I-2B)

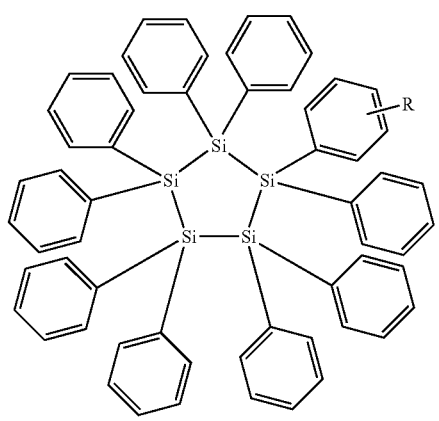

When the white particles has a structure in which a white colorant is dispersed or compounded in resin particles, or fixed on the surface of resin particles, the amount of the white colorant is preferably from 10 to 99% by weight, more preferably from 30 to 99% by weight, with respect to the amount of resin that forms the resin particles.

Other materials that may be compounded in the white particles include a charge control agent or a magnetic material. Examples of the charge control agent include known compounds used for electrophotographic toner materials, such as cetylpyridinium chloride, quaternary ammonium salts such as BONTRON P-51, BONTRON P-53, BONTRON E-84, and BONTRON E-81 (trade name, manufactured by Orient Chemical Industries, Ltd.), salicylic metal complexes, phenol condensates, tetraphenyl compounds, metal oxide particles, or metal oxide particles having the surface treated with a coupling agent.

In the invention, a silicone polymer may be bonded to (or applied on) the surface of the white mother particles. The silicone polymer refers to a polymer having a silicone chain, preferably a polymer having a silicone chain (silicone graft chain) as a side chain of the main chain of the polymer.

One preferable example of the silicone polymer is a copolymer of a silicone chain component and optionally at least one of a reactive component, a component having a charging group, and a component having no charging group. The raw material for these components (in particular, a silicone chain component) may be a monomer or a macromonomer. The macromonomer collectively refers to an oligomer (with a polymerization degree of 2 to about 300) or a polymer having a polymerizable functional group, and exhibits characteristics of a polymer and a monomer at the same time.

Examples of the silicone chain component include a dimethyl silicone monomer having a (meth)acrylate group on one terminal end, such as SILAPLANE FM-0711, FM-0721 and FM-0725 (trade name, manufactured by Chisso Corporation), X-22-174DX, X-22-2426 and X-22-2475 (trade name, manufactured by Shin-Etsu Chemical Co., Ltd.).

Examples of the reactive component include a glycidyl (meth)acrylate having an epoxy group, and an isocyanate monomer having an isocyanate group (such as KARENZ AOI and KARENZ MOI, trade name, manufactured by Showa Denko K.K.) Examples of the copolymerization component having a charging group or the copolymerization component having no charging group include the monomers having a charging group or the monomers having no charging group as mentioned above concerning the polymer having a charging group.

The silicone polymer may include a silicone chain component at an amount of from 3 to 60% by weight, preferably from 5 to 40% by weight with respect to the total amount of the polymer. When the amount of the silicone chain component is within the above range, stable dispersibility of the particles may be achieved as well as other properties (such as imparting of charge polarity or controlling of charge amount).

Another example of the silicone polymer is a silicone compound having an epoxy group at one terminal end (represented by the following Formula 1). Examples of the silicone compound having an epoxy group at one terminal end include X-22-173DX (trade name, manufactured by Shin-Etsu Chemical Co., Ltd.)

Formula 1

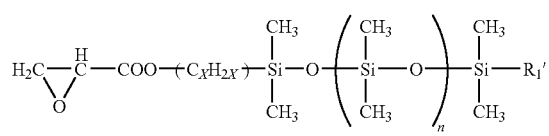

In Formula 1, $R_1'$ represents a hydrogen atom or an alkyl group having carbon atoms of 1 to 4, n represents a natural number of 1 to 1,000 for example, preferably 3 to 100, and x represents an integer of 1 to 3.

Yet another preferable example of the silicone polymer is a copolymer obtained from at least a dimethyl silicone monomer having a (meth)acrylate group at one terminal end as represented by the following Formula 2, such as SILA-PLANE FM-0711, FM-0721 and FM-0725 (trade name, manufactured by Chisso Corporation) and X-22-174DX, X-22-2426 and X-22-2475 (trade name, manufactured by Shin-Etsu Chemical Co., Ltd.), and a glycidyl(meth)acrylate or an isocyanate monomer, such as KARENZ AOI and KARENZ MOI (trade name, Showa Denko K.K.)

Formula 2

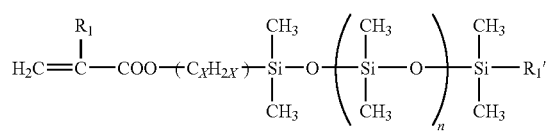

In Formula 2, $R_1$ represents a hydrogen atoms or a methyl group. $R_1'$ represents a hydrogen atom or an alkyl group having carbon atoms of 1 to 4, n represents a natural number of 1 to 1,000 for example, preferably 3 to 100, and x represents an integer of 1 to 3.

The weight average molecular weight of the silicone polymer is preferably from 500 to 1,000,000, more preferably from 1,000 to 1,000,000.

In the following, the method of bonding a silicone polymer to the white mother particles or applying a silicone polymer to the white mother particles will be described.

Examples of the above method include a coacervation method. Specifically, the coacervation method is a method including dispersing the white mother particles as prepared by a known process (such as pulverization, coacervation, dispersion-polymerization, or suspension-polymerization) in a first solvent in which the silicone polymer is dissolved, dropping a second solvent to the first solvent to emulsify, and then removing the first solvent and allowing the silicone polymer to precipitate on the white mother particles and react so as to be bonded to, or applied on, the surface of the white mother particles.

Examples of the first solvent include isopropyl alcohol (IPA), methanol, ethanol, butanol, tetrahydrofuran, ethyl acetate, and butyl acetate. Among these, isopropyl alcohol (IPA) is preferable since a stable dispersibility and charging properties can be achieved. The second solvent is preferably a silicone oil.

The method of bonding or application of the silicone polymer to the white mother particles is not particularly limited to the above process.

The particle dispersion for display that employs the white particles for display according to the invention includes particles including the white particles for display according to the invention, and a dispersing medium in which the particles are dispersed. The particle dispersion for display according to the invention may include other particles for display according to the invention (color particles). As necessary, the particle dispersion for display may further include an acid, an alkali, a salt, a dispersant, a dispersion stabilizer, a stabilizer for anti-oxidization or UV absorption, an antibacterial agent, an antiseptic agent, or the like.

The dispersing medium may be any material that can be used for a display medium, but when the aforementioned silicone polymer is bonded or applied to the surface of the white particles, a silicone oil is preferably used.

Examples of the charge control agent include an ionic or nonionic surfactant, a block or graft copolymer having a lipophilic portion and a hydrophilic portion, a compound having a polymeric skeleton of a cyclic, stellate or dendritic structure, a salicyclic metal complex, a catechol metal complex, a metal-containing bisazo dye, a tetraphenyl borate derivative, and a copolymer of a polymerizable macromer (such as SILAPLANE, trade name, manufactured by Chisso Corporation) and an anionic monomer or a cationic polymer.

Examples of the nonionic surfactant include polyoxyethylene nonyl phenyl ether, polyoxyethylene octyl phenyl ether, polyoxyethylene dodecyl phenyl ether, polyoxyethylene alkyl ether, polyoxyethylene aliphatic ester, sorbitan aliphatic ester, polyoxyethylene sorbitan aliphatic ester, and aliphatic alkylol amide.

Examples of the anionic surfactant include alkyl benzene sulfonate, alkyl phenyl sulfonate, alkyl naphthalene sulfonate, a higher fatty acid salt, a sulfate of a higher fatty acid ester, and a sulfonate of a higher fatty acid ester.

Examples of the cationic surfactant include a primary or tertiary amine salt, or a quaternary ammonium salt.

These charge control agents is preferably included at an amount of from 0.01 to 20% by weight, particularly preferably from 0.05 to 10% by weight, with respect to the solid content of the particles.

The particles for display and the particle dispersion for display according to the invention is applicable to an display medium employing an electrophoretic system, a liquid toner for an electrophotographic system employing a liquid development system, or the like.

(Display Medium and Display Device)

In the following, an example of the display medium and the display device according to this exemplary embodiment will be described.

First Exemplary Embodiment

Figure 2A:
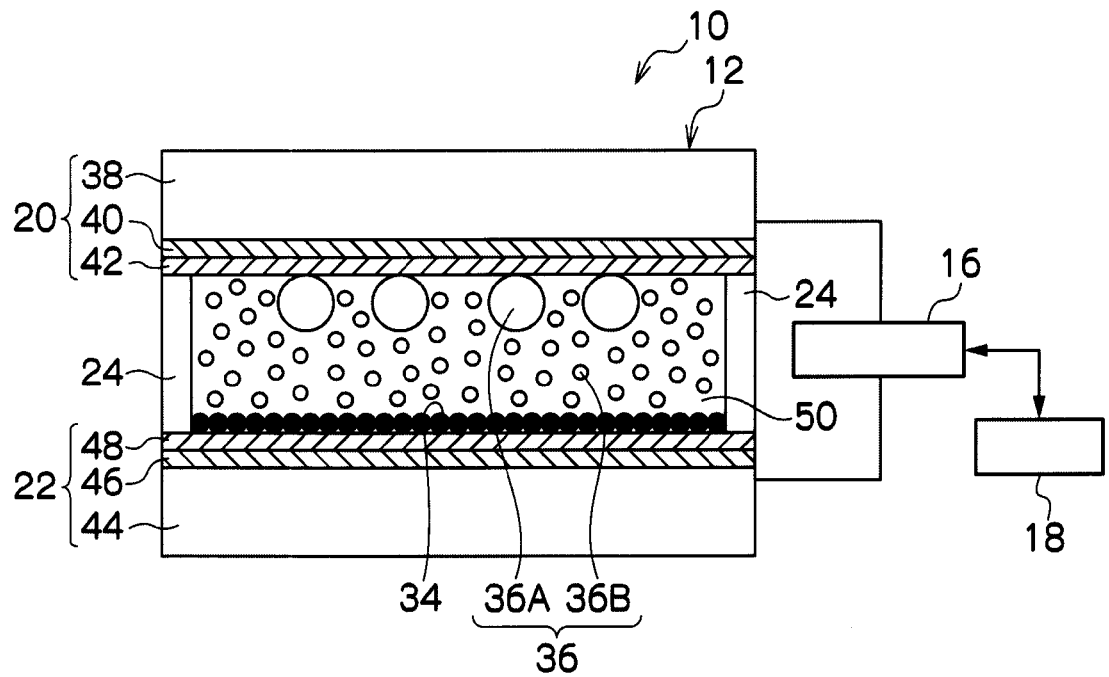
FIGS. 2A to 2C are schematic views showing how the particles move upon application of a voltage between the substrates of the display device according to the first exemplary embodiment of the invention.
Figure 2B:
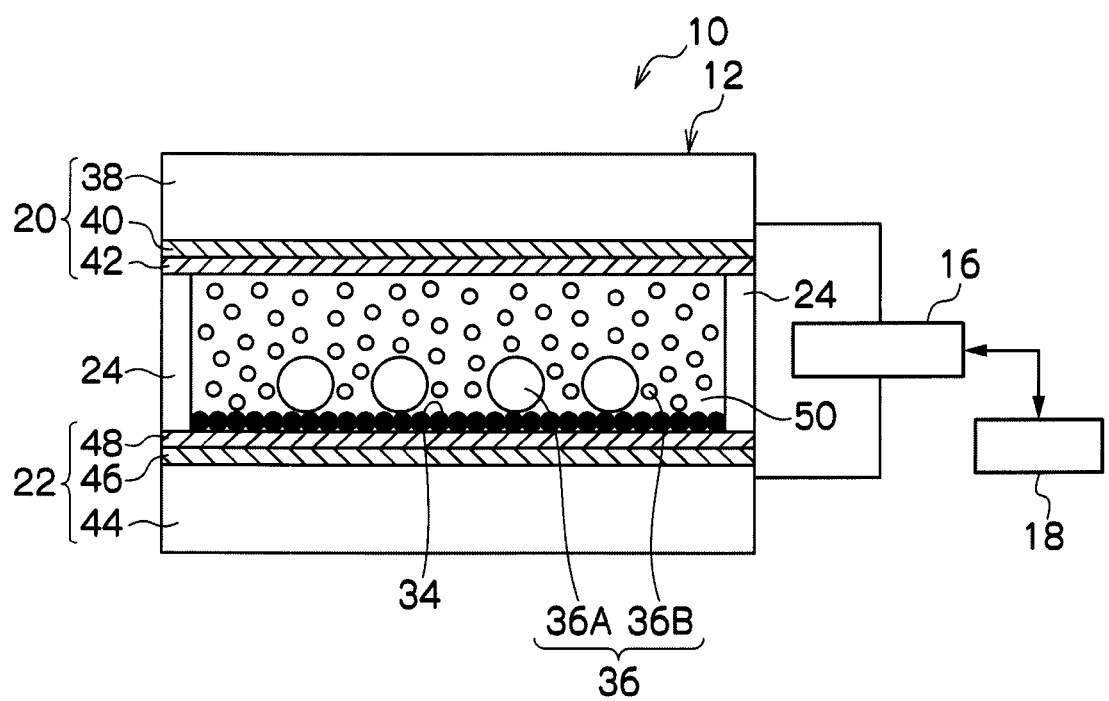
Figure 2C:
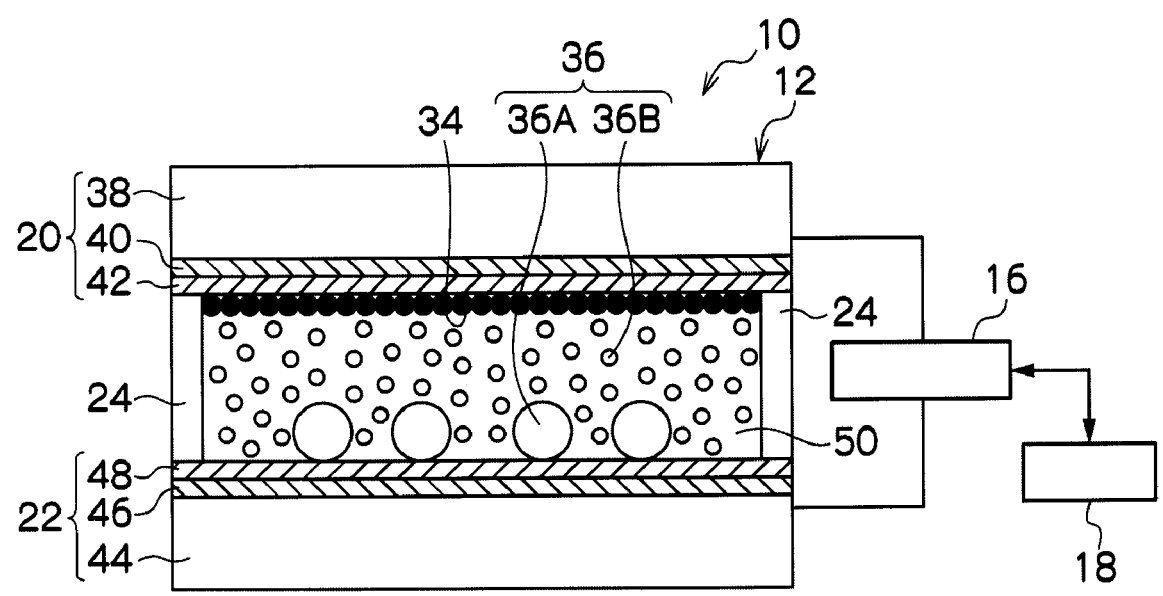

FIG. 1 is a schematic view of a display device according to the first exemplary embodiment. FIGS. 2A to 2C are schematic views showing how the particles move upon application of a voltage between the substrates of the display device according to the first exemplary embodiment of the invention.

Display device 10 according to the first exemplary embodiment employs color particles having a color other than white as mobile particles 34, and the white particles for display according to the invention as reflective particles 36. Among reflective particles 36, large reflective particles 36A correspond to the large white particles (first white particles) and small reflective particles 36B correspond to the small white particles (second white particles).

Display device 10 includes, as shown in FIG. 1, a display medium 12, a voltage application unit 16 that applies a voltage to display medium 12, and a control unit 18.

Display medium 12 includes a display substrate 20 that displays an image; a rear substrate 22 that is positioned opposite to display substrate 20 with a space; spacers 24 that maintain the substrates to be positioned with a specified space and divide the space between the substrates into plural cells; mobile particles 34 included in each cell; and reflective particles 36 having a different optical reflection property than that of mobile particles 34.

The cell as mentioned above refers to a space surrounded by display substrate 20, rear substrate 22, and spacers 24. A dispersing medium 50 is included in the cell. Mobile particles 34 consisting of plural kinds of particles are dispersed in dispersing medium 50, and move between display substrate 20 and rear substrate 22 through the gaps among reflective particles 36 in response to an electric field formed in the cell.

In this exemplary embodiment, mobile particles 34 included in each cell have a single specific color and are previously treated so as to be either positively or negatively charged.

It is also possible to design display medium 12 so that display can be performed at each pixel, by providing spacers 24 to form a cell so as to correspond to each pixel of an image to be displayed.

For the purpose of simplification, this exemplary embodiment will be described referring to a drawing that shows only a single cell. In the following, details of each component of the display device will be described.

Display substrate 20 includes, on a support 38, a front electrode 40 and a surface layer 42 in this order. Rear substrate 22 includes, on a support 44, a rear electrode 46 and a surface layer 48 in this order.

Only display substrate 20 or both display substrate 20 and rear substrate 22 are transparent. In this exemplary embodiment, being transparent refers to having a transmittance with respect to visible rays of 60% or more.

Materials for support 38 and support 44 include glass and plastics such as polyethylene terephthalate resin, polycarbonate resin, acrylic resin, polyimide resin, polyester resin, epoxy resin, and polyether sulfone resin.

Materials for front electrode 40 and rear electrode 46 includes oxides of indium, tin, cadmium, antimony or the like, composite oxides such as ITO, metals such as gold, silver, copper or nickel, and organic materials such as polypyrrole or polythiophene. Front electrode 40 and rear electrode 46 may be formed from a material such as those to a single film, a mixed film or a composite film, by a method of evaporation, sputtering, coating or the like. The thickness of front electrode 40 and rear electrode 46 is typically from 100 to 2,000 angstroms when these electrodes are formed by evaporation or sputtering. Front electrode 40 and rear electrode 46 may be formed in a desired patterned manner by a known method such as etching that is performed to form conventional liquid crystal displays or printed boards. For example, front electrode 40 and rear electrode 46 may be formed in a matrix pattern or a striped pattern that enables passive matrix driving.

Front electrode 40 may be embedded in support 38, or rear electrode 46 may be embedded in support 44. In this case, the material for supports 38 and 44 is selected in accordance with the composition of each kind of mobile particles 34.

Front electrode 40 and rear electrode 46 may be positioned outside display medium 12, separate from display substrate 20 and rear substrate 22.

In the above description, both display substrate 20 and rear substrate 22 are provided with an electrode (front electrode 40 and rear electrode 46). However, it is also possible to provide an electrode only to one substrate for performing active matrix driving.

In order to enable active matrix driving, a thin film transistor (TFT) may be provided to support 38 and support 44 at each pixel. The TFT is preferably formed on rear substrate 22 rather than on display substrate 20, since it is easier to form a multilayer wiring or packaging.

When display medium 12 is driven by a passive matrix system, the structure of display device 10 including display medium 12 can be simplified. When display medium 12 is driven by the active matrix system, a faster display speed as compared with that in the passive matrix system can be achieved.

When front electrode 40 and rear electrode 46 are formed on support 38 and support 44, respectively, dielectric films as surface layers 42 and 48 are optionally formed on front electrode 40 and rear electrode 46, respectively, in order to prevent breakage of the electrodes or leakage between the electrodes that causes fixation of mobile particles 34.

Examples of the material for surface layers 42 and 48 include polycarbonate, polyester, polystyrene, polyimide, epoxy, polyisocyanate, polyamide, polyvinyl alcohol, polybutadiene, polymethylmethacrylate, copolymerized nylon, UV-cured acrylic resin, and fluorocarbon resin.

Other than the aforementioned insulating materials, an insulating material in which a charge transporting substance is contained may also be used. Inclusion of a charge transporting substance in the insulating material may provide such effects as improving the charging properties of the particles by means of charge injection, or stabilizing the charge amount of the particles by allowing charges to leak from the particles when the charge amount is exceedingly increased.

Examples of the charge transporting substance include hole transporting substances such as hydrazone compounds, stilbene compounds, pyrazoline compounds, and arylamine compounds; and electron transporting substances such as fluorenone compounds, diphenoquinone compounds, pyrane compounds, and zinc oxide.

A self-supporting resin having a charge transporting property may also be used. Specific examples thereof include polyvinyl carbazole, and a polycarbonate obtained by polymerizing a specific hydroxyarylamine and bischloroformate, as described in the U.S. Pat. No. 4,806,443.

Since the dielectric film may affect the charging properties or fluidity of the particles, the material thereof is selected in accordance with the composition of the particles, or the like. Since display substrate 20 needs to be transparent, the surface layer of display substrate 20 is preferably formed from a transparent material.

Spacers 24 that maintain a space between display substrate 20 and rear substrate 22 are formed so as not to impair the transparency of display substrate 20, and are formed from thermoplastic resin, thermosetting resin, electron beam-curing resin, photo-curing resin, rubber, metal, or the like.

Spacers 24 may be formed in an integrated manner with either display substrate 20 or rear substrate 22. In this case, spacers 24 may be formed by subjecting support 38 or support 44 to an etching treatment, laser treatment, pressing treatment using a predetermined pattern, or printing treatment.

In this case, spacers 24 are formed on either side of display substrate 20 or rear substrate 22, or on both sides.

Spacers 24 may have a color or colorless, but is preferably colorless and transparent so as not to affect the image displayed on display medium 12. In this case, for example, spacers 24 are formed from a transparent polystyrene resin, polyester resin, or acrylic resin.

When spacers 24 are in the form of particles, glass particles may also be used to form spacers 24, as well as particles of a transparent polystyrene resin, polyester resin, or acrylic resin.

Being transparent here refers to having a transmittance of 60% or more with respect to visible rays.

Mobile particles 34 included in display medium 12 may be dispersed in a polymeric resin as dispersing medium 50. This polymeric resin may be a polymeric gel or a polymeric polymer.

Examples of the polymeric gel include most types of synthesic polymeric gel, and polymeric gels derived from a natural polymer such as agarose, agaropectin, amylose, sodium alginate, propylene glycol alginate, isolichenan, insulin, ethyl cellulose, ethylhydroxy ethyl cellulose, curdlan, casein, carrageenan, carboxymethyl cellulose, carboxymethyl starch, callose, agar, chitin, chitosan, silk fibroin, guar gum, quince seed, crown-gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pusturan, funoran, decomposed xyloglucan, pectin, porphyran, methyl cellulose, methyl starch, laminaran, lichenan, lentinan, and locust beam gum.

Further examples include polymers including a functional group of alcohol, ketone, ether, ester or amide in the repeating unit, such as polyvinyl alcohol, poly(meth)acrylamide, derivatives thereof, polyvinyl pyrrolidone, polyethylene oxide, or copolymers including these polymers.

Among these, gelatin, polyvinyl alcohol and poly(meth)acrylamide are preferably used in view of production stability and electrophoretic properties.

These aforementioned polymeric resins are preferably used as dispersing medium 50 together with the aforementioned insulating material.

Mobile particles 34 included in each cell and consisting of plural kinds of particles are dispersed in dispersing medium 50, and move between display substrate 20 and rear substrate 22 in response to the strength of an electric field formed in the cell.

Particles that constitute mobile particles 34 may be particles of an insulating metal oxide such as glass, alumina or titanium oxide, particles of thermoplastic resin or thermosetting resin, resin particles with a colorant fixed on the surface thereof, particles of thermoplastic resin or thermosetting resin including an insulating colorant therein, particles of metal colloid having a plasmon coloring function, or the like.

Examples of the thermoplastic resin for the mobile particles include homopolymers or copolymers of styrenes (such as styrene and chlorostyrene), mono-olefins (such as ethylene, propylene, butylene and isoprene), vinyl esters (such as vinyl acetate, vinyl propionate, vinyl benzoate and vinyl butyrate), α-methylene aliphatic monocarboxylates (such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate), vinyl ethers (such as vinyl methyl ether, vinyl ethyl ether and vinyl butyl ether), and vinyl ketones (such as vinyl methyl ketone, vinyl hexyl ketone and vinyl isopropenyl ketone).

Examples of the thermosetting resins for the mobile particles include crosslinked resins (such as a crosslinked copolymer including divinyl benzene as a main component and a crosslinked polymethyl methacrylate), phenol resins, urea resins, melamine resins, polyester resins and silicone resins. Particularly representative binder resins include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

Examples of the colorant include organic or inorganic pigments or oil-soluble dye. Examples of known colorants include magnetic powder of magnetite, ferrite or the like, carbon black, titanium oxide, magnesium oxide, zinc oxide, phthalocyanine copper cyan colorant, azo yellow colorant, azo magenta colorant, quinacridone magenta colorant, red colorant, green colorant, and blue colorant. Specific example thereof include aniline blue, calco oil blue, chrome yellow, ultramarine blue, DuPont oil red, quinoline yellow, methylene blue chloride, phthalocyanine blue, malachite green oxalate, lamp black, rose bengal, C.I. Pigment red 48:1, C.I. Pigment red 122, C.I. Pigment red 57:1, C.I. Pigment yellow 97, C.I. Pigment blue 15:1, C.I. Pigment blue 15:3. These colorants may be used alone or in combination.

As necessary, a charge control agent may be mixed in the resin for the mobile particles. Known charge control agents for use in eletrophotographic toner materials are applicable, and examples thereof include cetylpyridinium chloride, quaternary ammonium salts such as BONTRON P-51, BONTRON P-53, BONTRON E-84, and BONTRON E-81 (trade name, manufactured by Orient Chemical Industries, Ltd.), salicylic metal complexes, phenol condensates, tetraphenyl compounds, metal oxide particles, and metal oxide particles having the surface treated with a coupling agent of various kinds.

As necessary, a magnetic material may be mixed in the mobile particles, or applied on the surface thereof. The magnetic material may be an organic or inorganic magnetic material that may have an optional coating of a colorant. A transparent magnetic material, especially a transparent organic magnetic material is preferred since it does not inhibit coloring of the colored pigment, and has a specific gravity that is less than that of the organic magnetic material.

A colored magnetic powder, such as the small colored magnetic powder as disclosed in Japanese Patent Application Laid-Open (JP-A) No. 2003-131420, may be used as the magnetic material. For example, a magnetic powder including a core magnetic particle and a color layer formed on the core magnetic particles may be used. In this case, the color layer may be selected so as to color the magnetic powder with a pigment or the like in an opaque manner, but a thin film that exhibits a color by light interference is preferred. This thin film is formed from a colorless material such as $SiO_2$ or $TiO_2$ to a thickness equivalent to a wavelength of light, and reflects light in a selective manner due to light interference inside the thin film.

As necessary, an external additive may be attached to the surface of the mobile particles. The color of the external additive is preferably transparent so as not to affect the color of the mobile particles.

Materials for the external additive include particles of a metal oxide such as silicon oxide (silica), titanium oxide or alumina. The mobile particles may be surface-treated with a coupling agent or silicone oil, in order to adjust the charging property, fluidity or environment dependency of the mobile particles.

Examples of the coupling agent include positively charged ones such as aminosilane coupling agents, aminotitanium coupling agents and nitrile coupling agents, and negatively charged ones that do not include a nitrogen atom (consisting of atoms other than a nitrogen atom) such as silane coupling agent, titanium coupling agent, epoxysilane coupling agent, and acrylsilane coupling agent.

Examples of the silicone oil include positively charged ones such as amino-modified silicone oil, and negatively charged ones such as dimethyl silicone oil, alkyl-modified silicone oil, α-methylsulfone-modified silicone oil, methylphenyl silicone oil, chlorophenyl silicone oil, and fluorine-modified silicone oil.

These coupling agents or silicone oils may be selected depending on the desired resistivity of the external additive.

Among the above external additives, hydrophobic silica and hydrophobic titanium oxide that are well known in the art are preferred, and a titanium compound obtained by allowing $TiO(OH)_2$ to react with a silane compound such as a silane coupling agent, as described in JP-A No. 10-3177, is particularly preferred. Any of chlorosilanes, alkoxy silanes, silazanes, or specialty silylation reagents may be used as the silane compound. This titanium compound may be produced by allowing $TiO(OH)_2$ produced in a wet process to react with a silane compound or a silicone oil, and then drying the reactant. Since this process does not include sintering at a temperature of as high as several hundreds, no strong bond is formed among the Ti atoms and no aggregation occurs. Therefore, the mobile particles are in the form of primary particles. Further, since $TiO(OH)_2$ is directly allowed to react with a silane compound or silicone oil, it is possible to control the charging properties by adjusting the amount of silane compound or silicone oil used for the treatment, and even more improved charging properties can be achieved as compared with those of conventional titanium oxide.

The volume average particle size of the external additive is not particularly limited, but is typically from 5 nm to 100 nm, more preferably from 10 nm to 50 nm.

The compounding ratio of the external additive and the mobile particles may be determined depending on the size of the mobile particles and the external additive. When the amount of the external additive is too large, part of the external additive may be detached from the surface of mobile particles and attach to the surface of other mobile particles, thereby failing to obtain desired charging properties. Typically, the amount of the external additive may be from 0.01 to 3 parts by weight, preferably from 0.05 to 1 part by weight, with respect to 100 parts by weight of the mobile particles.

The external additive may be added to only one kind of the mobile particles, or may be added to two or more kinds, or all kinds of the mobile particles. The addition of the external additive to the surface of the mobile particles is preferably conducted by striking the external additive in the surface of the mobile particles with impact strength, or heating the surface of the mobile particles, so that the external additive is tightly fixed on the surface of the mobile particles. In this way, it is possible to inhibit external additive from being detached from the mobile particles and forming an aggregate of the external additive having different polarities that is hard to be dissociated by an electric field, thereby suppressing degradation of an image.

In this exemplary embodiment, mobile particles 34 will be described as having previously adjusted characteristics that contribute to the migration of mobile particles 34 in response to an electric field, such as the average charge amount or electrostatic amount, so that mobile particles 34 can move between display substrate 20 and rear substrate 22 in response to an electric field formed between these substrates.

The adjustment of average charge amount of each mobile particle of mobile particles 34 may be performed, specifically, by adjusting the type or amount of charge control agent to be compounded in the resin as mentioned above, the type or amount of polymer chain to be bound to the surface of the mobile particles, the type or amount of external additive to be added or embedded into the surface of the mobile particles, the type or amount of the surfactant, polymer chain or coupling agent to be applied to the surface of the mobile particles, or the specific surface area of the mobile particles (such as the volume average particle size or the shape factor).

The production of mobile particles 34 may be performed by any known method.

For example, as described in JP-A 7-325434, mobile particles 34 may be produced by measuring a resin, a pigment and a charge controlling agent at a specific mixing ratio, melting the resin by heating and adding the pigment thereto and mixing and dispersing the same, cooling and pulverizing the same using a jet mill, a hammer mill or a turbo mill to prepare the mobile particles, and then dispersing the obtained mobile particles in a dispersing medium.

Further, mobile particles 34 may be produced by preparing the mobile particles including the charge control agent inside thereof by a polymerization method such as suspension-polymerization, emulsification-polymerization or dispersion-polymerization, or an aggregation method such as coacervation, melt dispersion or emulsion-aggregation, and then the obtained mobile particles in a dispersing medium to prepare a dispersing medium including the mobile particles.

Moreover, there is a method of using an appropriate device that performs dispersion, mixing and kneading of the resin, colorant, charge control agent and/or dispersing medium at a temperature that is lower than the point of decomposition of the resin, colorant, charge control agent and/or dispersing medium, at which temperature the resin can plasticize and the dispersing medium does not boil. Specifically, the mobile particles can be obtained by mixing and heating to melt the pigment, resin and charge control agent in the dispersing medium using a planetary mixer or a kneader, cooling the mixture while stirring using the temperature dependency of the solvent solubility of the resin, and then allowing the mixture to coagulate/precipitate to form the mobile particles.

Additionally, there is a method of producing the mobile particles including placing the aforementioned raw materials in an appropriate container equipped with particulate media for dispersing and kneading, such as an attritor or a heated vibrating mill such as a ball mill, and then dispersing and kneading the content of the container at an appropriate temperature range, such as from 80 to 160° C. Preferred examples of the material for the particulate media include steels such as stainless steel or carbon steel, alumina, zirconia or silica. When producing the mobile particles by this method, the raw materials that have been previously made into a fluid state are further dispersed by the particulate media in the container, and the resin including the colorant is allowed to precipitate from the dispersing medium by cooling the dispersing medium. The particulate media maintain the state of motion during the cooling and after the cooling, and reduce the size of particles by generating shearing force or impact strength.

The content of mobile particles 34 (weight %) with respect to the total weight of the content of the cell is not particularly limited as long as the desired color hue can be obtained. It is effective for display medium 12 to adjust the content of mobile particles 34 by adjusting the thickness of the cell (i.e., the distance between display substrate 20 and rear substrate 22). Namely, in order to achieve the desired color hue, the content of mobile particles 34 can be reduced (or increased) by increasing (or reducing) the thickness of the cell. The content of mobile particles 34 is typically from 0.01 to 50% by weight.

Reflective particles 36 are particles that are not charged and include particles having different optical reflection characteristics than that of mobile particles 34, and function as a reflective member that displays a different color from that of mobile particles 34. Further, reflective particle 36 function as a spacer which allows mobile particles 34 to move through the space between display substrate 20 and rear substrate 22 without inhibiting the movement of mobile particles 34. Namely, each particle of mobile particles 34 moves through the gaps among reflective particles 36 from the side of rear substrate 22 toward the side of display substrate 20, or from the side of display substrate 20 toward the side of rear substrate 22.

Reflective particles 36 include large reflective particles 36A (large white particles) that move in response to an electric field, and small reflective particles 36B (small white particles) that do not move in response to an electric field. Reflective particles 36 may be included in a space between the substrate by an inkjet method or the like.

The content of reflective particles 36 (% by weight) with respect to the total weight of the content of the cell is not particularly limited as long as the desired color hue can be obtained. It is effective for display medium 12 to adjust the content of reflective particles 36 by adjusting the thickness of the cell (i.e., the distance between display substrate 20 and rear substrate 22). Namely, in order to achieve the desired color hue, the content of reflective particles 36 can be reduced (or increased) by increasing (or reducing) the thickness of the cell. The content of reflective particles 36 is typically from 1 to 70% by weight.

The size of the cell in display medium 12 has a close relationship with the definition of display medium 12, and display medium 12 that can display an image with a higher definition can be produced by reducing the size of the cell. The cell typically has a length in a plane direction of display substrate 20 of from 10 μm to about 1 mm.

Display substrate 20 and rear substrate 22 can be fixed to each other via spacer 24 using a combination of bolt and nut, a clamp, a clip, a flame for fixing the substrates, or the like. Alternatively, the substrates may be fixed to each other using an adhesive, or by performing hot-melting, ultrasonic bonding, or the like.

Display medium 12 having the aforementioned structure is applicable to media that can record an image or re-writing an image, such as bulletin boards, circulars, electronic black boards, advertisements, billboards, flash signals, electronic paper, electronic newspapers, electronic books, and document sheets for use in both copiers and printers.

As mentioned above, display device according to this exemplary embodiment includes display medium 12, voltage application unit 16 that applies a voltage to display medium 12, and control unit 18 (see FIG. 1).

Voltage application unit 16 is electrically connected to front electrode 40 and rear electrode 46. In the following, both of front electrode 40 and rear electrode 46 are described as being electrically connected to voltage application 16. However, it is also possible that one of these electrodes is grounded while the other is electrically connected to voltage application 16.

Voltage application unit 16 is connected to control unit 18 such that voltage application unit 16 can give or receive signals.

Control unit 18 may be a microcomputer including a CPU (central processing unit) that controls operation of the whole device, a RAM (random access memory) that temporarily records data of various kinds, and a ROM (read only memory) in which programs of various kinds, such as control program for controlling the whole device, are recorded.

Voltage application unit 16 applies a voltage to front electrode 40 and rear electrode 46 in accordance with instructions from control unit 18.

In the following, the function of display device 10 will be described in accordance with the operation of control unit 18.

In this exemplary embodiment, mobile particles 34 included in display medium 12 are black and negatively charged. Dispersion medium 50 is transparent, and reflective particles 36 are white. Namely, in this exemplary embodiment, display medium 12 displays a black color or a white color depending on the movement of mobile particles 34. Further, among reflective particles 36, large reflective particles 36A that move in response to an electric field are positively charged.

First, an initial operation signal is output to voltage application unit 16. This signal indicates application of a voltage for a specified time, such that front electrode 40 serves as a negative electrode and rear electrode 46 serves as a positive electrode. When a voltage that is negative and greater than a threshold voltage at which changes in the concentration of particles stops is applied between the substrates, mobile particles 34 that are negatively charged move toward the side of rear substrate 22 and reach rear substrate 22 (see FIG. 2A). On the other hand, large reflective particles 36A that are positively charged move toward the side of front substrate 20 and reach front substrate 20 (see FIG. 2A). Small reflective particles 36B remain in a dispersed state in dispersing medium 50.

At this time, display medium 12 displays a white color of reflective particles 36 at the side of display substrate 20.

Thereafter, when large reflective particles 36A are particles having a high specific gravity (for example, resin particles in which a white colorant having a high specific gravity such as titanium oxide is dispersed and compounded), large reflective particles 36A move from display substrate 20 toward the side of rear substrate 22 by their own weight, and settle (see FIG. 3B).

The time T1 required for the above process may be recorded in advance in a memory such as a ROM (not shown) in control unit 18 as information that indicates the time for voltage application in the initial operation, so that this information is read out upon execution of the operation.

Subsequently, when a voltage having a polarity opposite to the voltage that has been applied between the substrate is applied between the electrodes such that front electrode 40 serves as a positive electrode and rear electrode 46 serves as a negative electrode, mobile particles 34 move toward display substrate 20 to reach display substrate 20. At this time, display medium 12 displays a black color of mobile particles 34 (see FIG. 2C). On the other hand, large reflective particles 36A that are positively charged move toward rear substrate 22 to reach rear substrate 22 (see FIG. 2C). When large reflective particles 36A are forming a sedimentation at the side of rear substrate 22, large reflective particles 36A remain at the same position. At this time, small reflective particles 36B remain in a dispersed state in dispersing medium 50.

Large reflective particles 36A produce an effect of agitating dispersing medium 50 as they move during the black-and-white display. In addition, large reflective particles 36A apply an impact that is greater than that of mobile particles 34 to front substrate 20 or rear substrate 22. The impact applied to the substrate by large reflective particles 36A facilitates detachment of mobile particles 34 from the substrate, which also contributes to reduce the voltage for driving display medium 12.

In the above description, display device 10 (display medium 12) according to this exemplary embodiment employs mobile particles 34 of a single color, but mobile particles 34 of two or more colors may be used. In this case, large reflective particles 36A (large white particles) may have the same polarity as that of mobile particles 34 of at least one color. However, the absolute value of voltage at which large reflective particles 36A move in response to an electric field is preferably smaller than that of any of mobile particles 34. In this way, large reflective particles 36A reach display substrate 20 faster than any of mobile particles 34 and apply an impact to the substrate before mobile particles 34 arrive at the substrate, whereby influences on the display can be suppressed.

EXAMPLES

In the following, the present invention will be described in further details with reference to the Examples.

<Preparation of Small White Particles (and Dispersion Thereof)>

(Small White Particles 1 (Small White Particle Dispersion 1))

-Preparation of White Mother Particles-

A mixture of 5 g of polydiphenyl silane (trade name: SI-30-10, manufactured by Osaka Gas Chemicals Co., Ltd., refractive index: 1.74, specific gravity: 1.0), 25 g of zirconia beads having a diameter of 2 mm and 20 g of isopropyl alcohol (IPA) is placed in a ball mill and pulverized for 60 hours to form particles, and then the particles are classified to obtain particles of a polysilane compound having a volume average particle diameter of 0.3 μm. These particles are used as white mother particles.

-Preparation of Reactive Silicone Polymer- 30 parts by weight of a silicone monomer (silicone chain component) (trade name: SILAPLANE FM-0721, manufactured by Chisso Corporation, volume average molecular weight Mw: 5,000), and 65 parts by weight of n-vinyl pyrrolidone as a monomer having no charging group (other copolymerization component) are mixed in 300 parts by weight of isopropyl alcohol (IPA), and 1 part by weight of AIBN (2,2-azobisisobutylnitrile) as a polymerization initiator is dissolved therein. The mixture is subjected to polymerization reaction under a nitrogen atmosphere at 60° C. for 24 hours. The obtained product is purified using hexane as a re-precipitation solvent, and dried to obtain a silicone polymer (A).

1 g of white mother particles and 0.4 g of the silicone polymer (A) are dissolved and dispersed in 10 g of IPA, and mixed by stirring for 6 hours. This solution is gradually dropped in 20 g of 2CS silicone oil (trade name: KF96, manufactured by Shin-Etsu Chemical Co., Ltd.) and emulsified, and stirred intermittently with an ultrasonic homogenizer for 1 hour while cooling at 30° C. The solution is then heated to 50° C. and dried with reduced pressure to evaporate the IPA. White particle dispersion 1 having a volume average particle size of 0.3 μm and a specific gravity of 1 is thus obtained.

This dispersion is contained between a pair of electrode substrates, and the charging property of the particles in the dispersion is evaluated as a direction of electrophoretic movement of the particles upon application of a direct current. As a result, the particles do not migrate, indicating that the particles are not charged.

(Small White Particles 2 (Small White Particle Dispersion 2))

Small white particles dispersion 2 having a volume average particle diameter of 0.1 μm and a specific gravity of 1 is prepared in a similar manner to the small white particle dispersion 1, except that the pulverization in the ball mill is stopped when the volume average particle diameter is 0.1 μm.

This dispersion is contained between a pair of electrode substrates, and the charging property of the particles in the dispersion is evaluated as a direction of electrophoretic movement of the particles upon application of a direct current. As a result, the particles do not migrate, indicating that the particles are not charged.

(Small White Particles 3 (Small White Particle Dispersion 3))

Small white particles dispersion 3 having a volume average particle diameter of 3.0 μm and a specific gravity of 1 is prepared in a similar manner to the small white particle dispersion 1, except that the pulverization in the ball mill is stopped when the volume average particle diameter is 3.0 μm.

This dispersion is contained between a pair of electrode substrates, and the charging property of the particles in the dispersion is evaluated as a direction of electrophoretic movement of the particles upon application of a direct current. As a result, the particles do not migrate, indicating that the particles are not charged.

(Small White Particles 4 (Small White Particle Dispersion 4))

Small white particles dispersion 4 having a volume average particle diameter of 3.5 μm and a specific gravity of 1 is prepared in a similar manner to the small white particle dispersion 1, except that the pulverization in the ball mill is stopped when the volume average particle diameter is 3.5 μm.

This dispersion is contained between a pair of electrode substrates, and the charging property of the particles in the dispersion is evaluated as a direction of electrophoretic movement of the particles upon application of a direct current. As a result, the particles do not migrate, indicating that the particles are not charged.

(Small White Particles 5 (Small White Particle Dispersion 5))

Small white particles dispersion 5 having a volume average particle diameter of 0.06 μm and a specific gravity of 2.1 is prepared in a similar manner to the small white particle dispersion 1, except that titanium oxide particles (trade name: TTO-55 (D), manufactured by Ishihara Sangyo Kaisha, Ltd., volume average particles size: 0.05 μm, refractive index: 2.7, specific gravity: 3.8) are used as the white mother particles.

This dispersion is contained between a pair of electrode substrates, and the charging property of the particles in the dispersion is evaluated as a direction of electrophoretic movement of the particles upon application of a direct current. As a result, the particles do not migrate, indicating that the particles are not charged.

<Preparation of Large White Particles (Large White Particle Dispersion)>

(Preparation of Comparative Large White Particles 1)

-Preparation of Dispersion A1-

Dispersion A1 is prepared by mixing the following components, and pulverizing the same in a ball mill with zirconia balls having a diameter of 10 mm for 20 hours.

<Composition>

| Cyclohexyl methacrylate | 61 parts by weight |
| Divinyl methoxy silane | 1 part by weight |
| Titanium oxide (white pigment) (trade name: TIPAQUE CR63, manufactured by Ishihara Sangyo Kaisha, Ltd., volume average particle size: 0.3 μm, refractive index: 2.7, specific gravity: 3.9) | 35 parts by weight |
| Hollow particles (primary diameter: 0.3 μm) (trade name: SX866(A), manufactured by JSR Corporation) | 3 parts by weight |
| Charge controlling agent (trade name: SBT-5-0016, manufactured by Orient Chemical Industry Co., Ltd.) | 1 part by weight |

-Preparation of Calcium Carbonate Dispersion B1-

Calcium carbonate dispersion B1 is prepared by mixing the following components and finely pulverizing in a ball mill in a similar manner to the above.

<Composition>

| Calcium carbonate | 40 parts by weight |
| Water | 60 parts by weight |

-Preparation of Mixed Solution C1-

Mixed solution C1 is prepared by mixing the following components and degassing with an ultrasonic machine for 10 minutes, and then stirring the mixture with an emulsifier.

<Composition>

| Calcium carbonate dispersion B1 | 8.5 g |
| 20% salt water | 50 g |

35 g of dispersion A1, 1 g of ethylene glycol dimethacrylate and 0.35 g of polymerization initiator (AIBN) are weighed and thoroughly mixed, and the mixture is subjected to degassing for 2 minutes using an ultrasonic machine. This is added to mixed solution C1 and emulsified with an emulsifier. The obtained emulsion is placed in a bottle and sealed with a silicone cap. Then, the content is subjected to degassing with reduced pressure to a sufficient degree using an injection needle, and is sealed with a nitrogen gas. In this state, the content is allowed to react at 65° C. for 15 hours to form particles. The obtained particles are dispersed in ion exchange water and the calcium carbonate is allowed to decompose with hydrochloric acid water, and then filtered. Thereafter, the particles are washed with a sufficient amount of distilled water to obtain unclassified white particles. The size of the particles is regulated by passing through nylon sieves having an opening of 10 μm and 15 μm, respectively. Thereafter, the particles are dried and large white particles 1 having a volume average particle size of 13 μm and a specific gravity of 1.5 are thus obtained.

(Preparation of Comparative Large White Particle Dispersion 1)

Comparative large white particle dispersion 1 is obtained by dispersing 0.5 g of comparative large white particles 1 in 20 g of 2CS silicone oil (trade name: KF96, manufactured by Shin-Etsu Chemical Co., Ltd.)

This dispersion is contained between a pair of electrode substrates, and the charging property of the particles in the dispersion is evaluated as a direction of electrophoretic movement of the particles upon application of a direct current. As a result, the particles are negatively charged.

(Preparation of Comparative Large White Particles 2)

Comparative large white particles 2 having a volume average particle size of 20 μm and a specific gravity of 1.5 are obtained by taking out the particles remaining on the nylon sieve having an opening of 15 μm in the preparation of large white particles 1, passing the same through a nylon sieve having an opening of 25 μm to regulate the particle size, and then drying the same.

(Preparation of Comparative Large White Particle Dispersion 2)

Comparative large white particles dispersion 2 is obtained by dispersing 0.5 g of comparative large white particles 2 in 20 g of 2CS silicone oil (trade name: KF96, manufactured by Shin-Etsu Chemical Co., Ltd.)

This dispersion is contained between a pair of electrode substrates, and the charging property of the particles in the dispersion is evaluated as a direction of electrophoretic movement of the particles upon application of a direct current. As a result, the particles are negatively charged.

(Preparation of Comparative Large White Particles 3)

Large white particles 3 having a volume average particle size of 22 μm and a specific gravity of 1.5 are obtained by taking out the particles remaining on the nylon sieve having an opening of 15 μm in the preparation of comparative large white particles 1, passing the same through a nylon sieve having an opening of 32 μm to regulate the particle size, and then drying the same.

(Preparation of Comparative Large White Particle Dispersion 3)

Comparative large white particles dispersion 3 is obtained by dispersing 0.5 g of comparative large white particles 3 in 20 g of 2CS silicone oil (trade name: KF96, manufactured by Shin-Etsu Chemical Co., Ltd.)

This dispersion is contained between a pair of electrode substrates, and the charging property of the particles in the dispersion is evaluated as a direction of electrophoretic movement of the particles upon application of a direct current. As a result, the particles are negatively charged.

(Preparation of Comparative Large White Particles 4)

Comparative large white particles 4 having a volume average particle size of 3 μm and a specific gravity of 1.5 are obtained by taking out the particles remaining on the nylon sieve having an opening of 15 μm in the preparation of comparative large white particles 1, passing the same through a nylon sieve having an opening of 5 μm to regulate the particle size, and then performing decantation.

(Preparation of Comparative Large White Particle Dispersion 4)

Comparative large white particles dispersion 4 is obtained by dispersing 0.5 g of comparative large white particles 4 in 20 g of 2CS silicone oil (trade name: KF96, manufactured by Shin-Etsu Chemical Co., Ltd.)

This dispersion is contained between a pair of electrode substrates, and the charging property of the particles in the dispersion is evaluated as a direction of electrophoretic movement of the particles upon application of a direct current. As a result, the particles are negatively charged.

(Preparation of Comparative Large White Particles 5)

Comparative large white particles 5 having a volume average particle size of 13 μm and a specific gravity of 1.6 are obtained in a similar manner to the preparation of comparative large white particles 1, except that zirconium oxide (trade name: UEP ZIRCONIUM OXIDE, manufactured by Daiichi Kigenso Kagaku Kogyo Co., Ltd., volume average particle size: 0.6 μm, refractive index: 2.4, specific gravity: 5.8) is used instead of titanium oxide.

(Preparation of Comparative Large White Particle Dispersion 5)

Comparative large white particles dispersion 5 is obtained by dispersing 0.5 g of comparative large white particles 5 in 20 g of 2CS silicone oil (trade name: KF96, manufactured by Shin-Etsu Chemical Co., Ltd.)

This dispersion is contained between a pair of electrode substrates, and the charging property of the particles in the dispersion is evaluated as a direction of electrophoretic movement of the particles upon application of a direct current. As a result, the particles are negatively charged.

(Preparation of Large White Particle Dispersion 1)
-Preparation of Reactive Silicone Polymer- 30 parts by weight of a silicone monomer (silicone chain component) (trade name: SILAPLANE FM-0721, manufactured by Chisso Corporation, volume average molecular weight Mw: 5,000), 5 parts by weight of diethylaminoethyl acrylate (DEAEMA) as a monomer having a charging group (component having a charging group) and 65 parts by weight of hydroxy methacrylate as a monomer having no charging group (copolymerization component having no charging group) are mixed in 300 parts by weight of isopropyl alcohol (IPA), and 1 part by weight of AIBN (2,2-azobisisobutylnitrile) as a polymerization initiator is dissolved therein. The mixture is subjected to polymerization reaction under a nitrogen atmosphere at 60° C. for 24 hours. The obtained product is purified using hexane as a re-precipitation solvent, and is dried to obtain a silicone polymer.

Subsequently, 1 g of comparative large white particles 1 and 0.4 g of the silicone polymer as prepared above are dissolved and dispersed in 10 g of IPA, and are mixed by stirring for 6 hours. This solution is gradually dropped in 20 g of 2CS silicone oil (trade name: KF96, manufactured by Shin-Etsu Chemical Co., Ltd.) and emulsified, and is stirred intermittently with an ultrasonic homogenizer for 1 hour while cooling at 30° C. The solution is then heated to 50° C. and dried with reduced pressure to evaporate the IPA. White particle dispersion 1 having a volume average particle size of 13 μm and a particle specific gravity of 1.3 is thus obtained.

This dispersion is contained between a pair of electrode substrates, and the charging property of the particles in the dispersion is evaluated as a direction of electrophoretic movement of the particles upon application of a direct current. As a result, the particles are positively charged.

(Preparation of Large White Particle Dispersion 2)

Large white particle dispersion 2 having a volume average particle size of 20 μm and a particle specific gravity of 1.3 is obtained in a similar manner to the preparation of large particle dispersion 1, except that comparative large white particles 2 are used in place of comparative large white particles 1.

This dispersion is contained between a pair of electrode substrates, and the charging property of the particles in the dispersion is evaluated as a direction of electrophoretic movement of the particles upon application of a direct current. As a result, the particles are positively charged.

(Preparation of Large White Particle Dispersion 3)

Large white particle dispersion 3 having a volume average particle size of 22 μm and a particle specific gravity of 1.3 is obtained in a similar manner to the preparation of large white particle dispersion 1, except that comparative large white particles 3 are used in place of comparative large white particles 1.

This dispersion is contained between a pair of electrode substrates, and the charging property of the particles in the dispersion is evaluated as a direction of electrophoretic movement of the particles upon application of a direct current. As a result, the particles are positively charged.

(Preparation of Large White Particle Dispersion 4)

Large white particle dispersion 4 having a volume average particle size of 3 μm and a particle specific gravity of 1.3 is obtained in a similar manner to the preparation of large particle dispersion 1, except that comparative large white particles 4 are used in place of comparative large white particles 1.

This dispersion is contained between a pair of electrode substrates, and the charging property of the particles in the dispersion is evaluated as a direction of electrophoretic movement of the particles upon application of a direct current. As a result, the particles are positively charged.

(Preparation of Large White Particle Dispersion 5)

Large white particle dispersion 5 having a volume average particle size of 13 μm and a particle specific gravity of 1.3 is obtained in a similar manner to the preparation of large white particle dispersion 1, except that comparative large white particles 4 are used in place of comparative large white particles 1.

This dispersion is contained between a pair of electrode substrates, and the charging property of the particles in the dispersion is evaluated as a direction of electrophoretic movement of the particles upon application of a direct current. As a result, the particles are positively charged.

(Preparation of Cyan Particles and Cyan Particle Dispersion)

65 parts by weight of hydroxyethyl methacrylate, 30 parts by weight of a silicone monomer (trade name: SILAPLANE FM-0721, manufactured by Chisso Corporation, volume average molecular weight Mw: 5,000), and 5 parts by weight of methacrylic acid are mixed in 100 parts by weight of IPA, and 0.2 parts by weight of AIBN as a polymerization initiator is dissolved therein. The mixture is subjected to polymerization reaction under a nitrogen atmosphere at 70° C. for 6 hours. The obtained product is purified using hexane as a re-precipitation solvent, and dried to obtain a polymer.

Subsequently, 0.5 g of the polymer as prepared above is added to 9 g of IPA and dissolved, and then 0.5 g of a cyan pigment (trade name: CYANINE BLUE 4973, manufactured by Sanyo Color Works, Ltd.) is added therein. This mixture is dispersed using zirconia balls having a diameter of 0.5 mm for 48 hours, thereby obtaining a pigment-containing polymer solution.

12 g of 2CS silicone oil (trade name: KF96, manufactured by Shin-Etsu Chemical Co., Ltd.) is gradually dropped in 3 g of the pigment-containing polymer solution as prepared above while applying ultrasonic waves, and is then emulsified. Thereafter, the emulsified solution is heated to 60° C. and dried with reduced pressure to evaporate the IPA, thereby obtaining particles for display including a polymer and a pigment. The obtained particles are separated using a centrifuge separator, and the supernatant liquid is removed. 5 g of silicone oil as mentioned above is further added to the particles, ultrasonic waves are applied and washed, and then allowed to separate using a centrifuge separator, and the supernatant liquid is removed. 5 g of silicone oil as mentioned above is further added to the particles, and a cyan particle dispersion is obtained. The volume average particle size of cyan particles is 0.2 μm.

This dispersion is contained between a pair of electrode substrates, and the charging property of the particles in the dispersion is evaluated as a direction of electrophoretic movement of the particles upon application of a direct current. As a result, the particles are negatively charged.

EXAMPLES AND COMPARATIVE EXAMPLES 3 parts by weight of a mixture of the large white particle dispersion and the small white particle dispersion as combined in accordance with Tables 1 to 3, 1 part by weight of the cyan particle dispersion and 6 parts by weight of silicone oil (trade name: KF96, manufactured by Shin-Etsu Chemical Co., Ltd.) as a dispersant are mixed. This mixture is contained in a cell formed by a pair of glass substrates on which an indium tin oxide (ITO) electrode is formed and a spacer of 50 μm positioned between the electrodes, thereby preparing a device sample.

Although the comparative large white particles 1 to 5 are negatively charged, these particles do not move upon application of a driving voltage in the following evaluation of the device samples.

<Evaluation>

A direct current (DC) at a voltage of 10V is applied to the substrates of the device sample, and the particles for display are moved by changing the polarity of the current. When a positive voltage is applied to the electrode at the display side, the cyan particles move to the glass substrate at the display side, whereby a cyan color is displayed. On the other hand, when a negative voltage is applied to the electrode at the display side, the cyan particles move to the glass substrate at the rear side, whereby a white color is exhibited. This cycle of displaying a cyan color and a white color is repeated for 100 times, and the occurrence of display irregularity is examined. The device sample is left to stand in this state for 3 hours, and then the whiteness of white color display and the display irregularities are examined. Further, the display irregularity in cyan color display is also examined.

-Whiteness of White Color Display-

The whiteness of the white color display is evaluated by measuring a white reflection density using a color reflection densitometer (trade name: X-RITE 404, manufactured by X-Rite Corporation), and then converting the obtained value to a white reflectance ratio according to the following formula. The difference between the whiteness as measured at the initial stage and the whiteness as measured after performing the display process for 100 times is evaluated according to the following criteria.

Whiteness (white reflectance ratio)=$10^{-(\text{white reflection density})} \times 100\%$ A: 0 to 10%
B: 11 to 15%
C: 16 to 20%
D: 21% or more -Display Irregularity in White Color Display- The display irregularity in white color display is evaluated by comparing a photograph of the device sample displaying a white color at an initial stage and a photograph of the device sample displaying a white color after performing the display process for 100 times, according to the following criteria.

A: The white color hardly changes from the initial stage.
B: The white color is slightly mixed with a cyan color, but the cyan color is not conspicuous and whiteness is maintained at a high degree.
C: The white color is mixed with a cyan color, but the contrast between the white color display and the cyan color display is maintained.
D: The white color is significantly mixed with a cyan color, and exhibits a strong cyan color.

-Display Irregularity in Cyan Display-

The display irregularity in cyan color display is evaluated by comparing a photograph of the device sample displaying a cyan color at an initial stage and a photograph of the device sample displaying a cyan color after performing the display process for 100 times, according to the following criteria.

A: The cyan color hardly changes from the initial stage.
B: The cyan color is slightly mixed with a white color, but not conspicuous.
C: The cyan color is mixed with a white color, but the contrast between the white color display and the cyan color display is maintained.
D: The cyan color display is significantly mixed with a white color, and exhibits a weak cyan color.

TABLE 1

| | Large white particle dispersion | Small white particle dispersion | Mixing ratio of large white particle dispersion and small white particle dispersion (L/S) | Ratio of number of large white particles to the number of small white particles (L/S) | Whiteness in white display | Display irregularities in white display | Display irregularities in cyan display |
|---|---|---|---|---|---|---|---|
| Ex. A1 | 1 | 1 | 1/4 | $1/4.23 \times 10^5$ | A | A | A |
| Ex. A2 | 1 | 2 | 1/4 | $1/1.14 \times 10^7$ | B | B | B |
| Comp. Ex. A3 | 1 | 3 | 1/4 | $1/4.23 \times 10^2$ | D | D | D |
| Comp. Ex. A4 | 1 | 4 | 1/4 | $1/2.66 \times 10^2$ | D | D | D |
| Ex. A5 | 1 | 5 | 1/4 | $1/2.52 \times 10^7$ | C | C | C |
| Ex. B1 | 2 | 1 | 1/4 | $1/1.54 \times 10^6$ | A | A | A |
| Ex. B2 | 2 | 2 | 1/4 | $1/4.16 \times 10^7$ | C | C | C |
| Comp. Ex. B3 | 2 | 3 | 1/4 | $1/1.54 \times 10^3$ | D | D | D |
| Comp. Ex. B4 | 2 | 4 | 1/4 | $1/9.70 \times 10^2$ | D | D | D |
| Comp. Ex. B5 | 2 | 5 | 1/4 | $1/9.17 \times 10^7$ | D | D | D |
| Ex. C1 | 3 | 1 | 1/4 | $1/2.05 \times 10^6$ | B | B | B |
| Comp. Ex. C2 | 3 | 2 | 1/4 | $1/5.54 \times 10^7$ | D | D | D |
| Comp. Ex. C3 | 3 | 3 | 1/4 | $1/2.05 \times 10^3$ | D | D | D |
| Comp. Ex. C4 | 3 | 4 | 1/4 | $1/1.29 \times 10^3$ | D | D | D |
| Comp. Ex. C5 | 3 | 5 | 1/4 | $1/1.22 \times 10^8$ | D | D | D |
| Comp. Ex. D1 | 4 | 1 | 1/4 | $1/5.20 \times 10^3$ | D | D | D |
| Ex. D2 | 4 | 2 | 1/4 | $1/1.40 \times 10^5$ | A | A | A |

TABLE 1-continued

| | Large white particle dispersion | Small white particle dispersion | Mixing ratio of large white particle dispersion and small white particle dispersion (L/S) | Ratio of number of large white particles to the number of small white particles (L/S) | Whiteness in white display | Display irregularities in white display | Display irregularities in cyan display |
|---|---|---|---|---|---|---|---|
| Ex. D3 | 4 | 5 | 1/4 | $1/3.10 \times 10^5$ | A | A | A |
| Ex. F1 | 5 | 1 | 1/4 | $1/4.23 \times 10^5$ | A | A | A |
| Ex. F2 | 5 | 2 | 1/4 | $1/1.14 \times 10^7$ | C | C | C |
| Comp. Ex. F3 | 5 | 3 | 1/4 | $1/4.23 \times 10^2$ | D | D | D |
| Comp. Ex. F4 | 5 | 4 | 1/4 | $1/2.66 \times 10^2$ | D | D | D |
| Ex. F5 | 5 | 5 | 1/4 | $1/2.52 \times 10^7$ | C | C | C |

TABLE 2

| | Large white particle dispersion | Small white particle dispersion | Mixing ratio of large white particle dispersion and small white particle dispersion (L/S) | Ratio of number of large white particles to the number of small white particles (L/S) | Whiteness in white display | Display irregularities in white display | Display irregularities in cyan display |
|---|---|---|---|---|---|---|---|
| Ex. G1 | 3 | 1 | 1/4 | $1/2.05 \times 10^6$ | A | A | A |
| Ex. G2 | 3 | 1 | 1/9 | $1/4.61 \times 10^6$ | A | A | A |
| Comp. Ex. G3 | 3 | 1 | 9/1 | $1/5.7 \times 10^4$ | D | D | D |
| Comp. Ex. G4 | 3 | 1 | 19/1 | $1/2.7 \times 10^4$ | D | D | D |
| Ex. G5 | 3 | 1 | 1/19 | $1/9.74 \times 10^6$ | A | A | A |
| Ex. G6 | 3 | 1 | 1/1 | $1/5.13 \times 10^5$ | A | A | A |
| Ex. G7 | 3 | 1 | 1/99 | $1/5.08 \times 10^7$ | C | C | C |
| Comp. Ex. G8 | 3 | 1 | 1/100 | $1/5.13 \times 10^7$ | D | D | D |
| Comp. Ex. G9 | 3 | 1 | 20/1 | $1/2.56 \times 10^4$ | D | D | D |

TABLE 3

| | Large white particle dispersion | Small white particle dispersion | Mixing ratio of large white particle dispersion and small white particle dispersion (L/S) | Ratio of number of large white particles to the number of small white particles (L/S) | Whiteness in white display | Display irregularities in white display | Display irregularities in cyan display |
|---|---|---|---|---|---|---|---|
| Comp. Ex. 1 | 1 (comparative) | 1 | 1/4 | $4.88 \times 10^5$ | D | D | D |
| Comp. Ex. 2 | 2 (comparative) | 1 | 1/4 | $1.78 \times 10^6$ | D | D | D |
| Comp. Ex. 3 | 3 (comparative) | 1 | 1/4 | $2.36 \times 10^6$ | D | D | D |
| Comp. Ex. 4 | 4 (comparative) | 1 | 1/4 | $6.0 \times 10^3$ | D | D | D |
| Comp. Ex. 5 | 5 (comparative) | 1 | 1/4 | $4.88 \times 10^5$ | D | D | D |
| Comp. Ex. 6 | 1 | — | — | — | D | D | D |
| Comp. Ex. 7 | — | 1 | — | — | D | D | D |

As shown in Tables 1 to 3, the samples obtained in the Examples achieve a white display with a high degree of whiteness and a cyan/white display with suppressed display irregularities, as compared with the samples obtained in the Comparative Examples.

All publications, patent applications, and technical standards mentioned in this specification are herein incorporated by reference to the same extent as if each individual publication, patent application, or technical standard was specifically and individually indicated to be incorporated by reference.

What is claimed is:

1. White particles for display comprising first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship:

$$1/(5.1 \times 10^7) \leq L/S \leq 1/(2.8 \times 10^4).$$

2. The white particles for display according to claim 1, wherein the ratio L/S satisfies the following relationship:

$$1/(1.0 \times 10^6) \leq L/S \leq 1/(3.0 \times 10^4).$$

3. The white particles for display according to claim 1, wherein the ratio L/S satisfies the following relationship:

$$1/(5.0 \times 10^6) \leq L/S \leq 1/(1.0 \times 10^5).$$

4. The white particles for display according to claim 1, wherein the second white particles comprise a polysilane compound.

5. A particle dispersion for display comprising white particles for display and a dispersing medium in which the white particles for display are dispersed, the white particles for display comprising first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship:

$$1/(5.1 \times 10^7) \leq L/S \leq 1/(2.8 \times 10^4).$$

6. The particle dispersion for display according to claim 5, wherein the ratio L/S satisfies the following relationship:

$$1/(1.0\times10^6) \leq L/S \leq 1/(3.0\times10^4).$$

7. The particle dispersion for display according to claim 5, wherein the ratio L/S satisfies the following relationship:

$$1/(5.0\times10^6) \leq L/S \leq 1/(1.0\times10^5).$$

8. The particle dispersion for display according to claim 5, wherein the second white particles comprise a polysilane compound.

9. A display medium comprising:
- a pair of substrates facing each other with a space therebetween, at least one of the substrates being transparent;
- color particles that are positioned between the substrates and move between the substrates in response to an electric field formed between the substrates;
- white particles for display positioned between the substrates; and
- a dispersing medium positioned between the substrates in which the color particles and the white particles for display are dispersed, the white particles for display comprising first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship:

$$1/(5.1\times10^7) \leq L/S \leq 1/(2.8\times10^4).$$

10. The display medium according to claim 9, wherein the ratio L/S satisfies the following relationship:

$$1/(1.0\times10^6) \leq L/S \leq 1/(3.0\times10^4).$$

11. The display medium according to claim 9, wherein the ratio L/S satisfies the following relationship:

$$1/(5.0\times10^6) \leq L/S \leq 1/(1.0\times10^5).$$

12. The display medium according to claim 9, wherein the second white particles comprise a polysilane compound.

13. A display device comprising a display medium and an electric field formation unit, the display medium comprising:
- a pair of substrates facing each other with a space therebetween, at least one of the substrates being transparent;
- color particles that are positioned between the substrates and move between the substrates in response to an electric field formed between the substrates;
- white particles for display positioned between the substrates; and
- a dispersing medium positioned between the substrates in which the color particles and the white particles for display are dispersed, the white particles for display comprising first white particles that move in response to an electric field and second white particles that do not move in response to an electric field, the second white particles having a volume average particle size that is less than that of the first white particles, and a ratio of the numerical amount of the first white particles/the second white particles (L/S) satisfying the following relationship:

$$1/(5.1\times10^7) \leq L/S \leq 1/(2.8\times10^4), \text{ and}$$

the electric field formation unit forming an electric field between the pair of substrates.

14. The display device according to claim 13, wherein the ratio L/S satisfies the following relationship:

$$1/(1.0\times10^6) \leq L/S \leq 1/(3.0\times10^4).$$

15. The display device according to claim 13, wherein the ratio L/S satisfies the following relationship:

$$1/(5.0\times10^6) \leq L/S \leq 1/(1.0\times10^5).$$

16. The display device according to claim 13, wherein the second white particles comprise a polysilane compound.

\* \* \* \* \*